May 31, 1966 H. A. VON PECHMANN 3,253,592
PLASTIC SYRINGE
Filed June 8, 1962 2 Sheets-Sheet 1
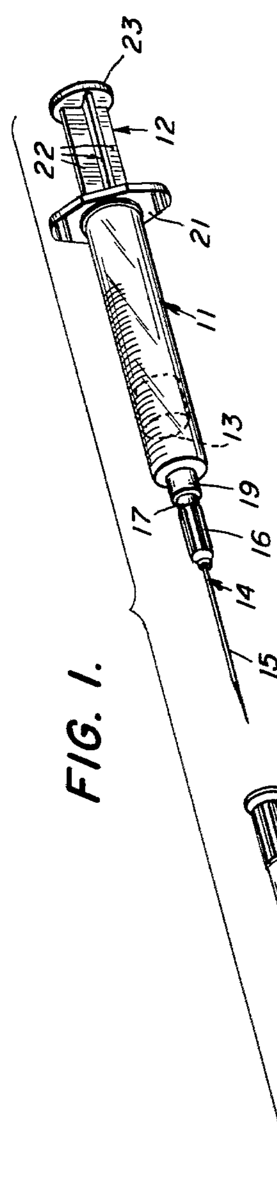
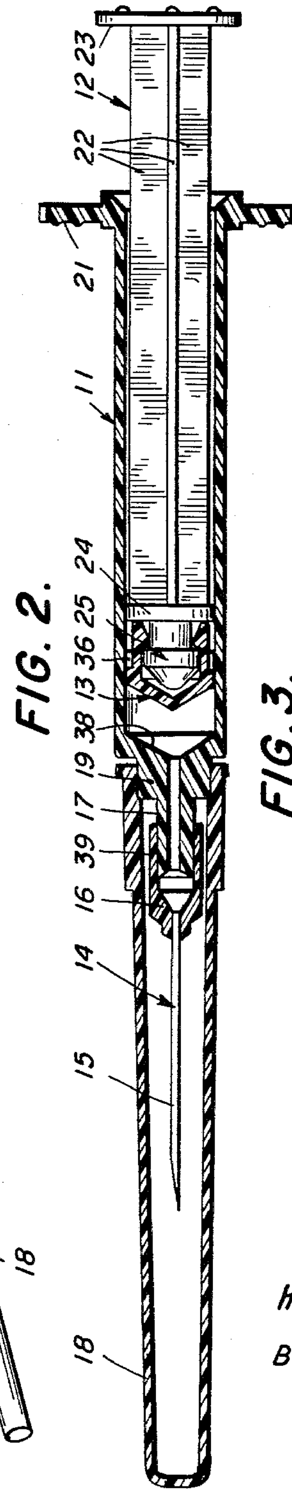
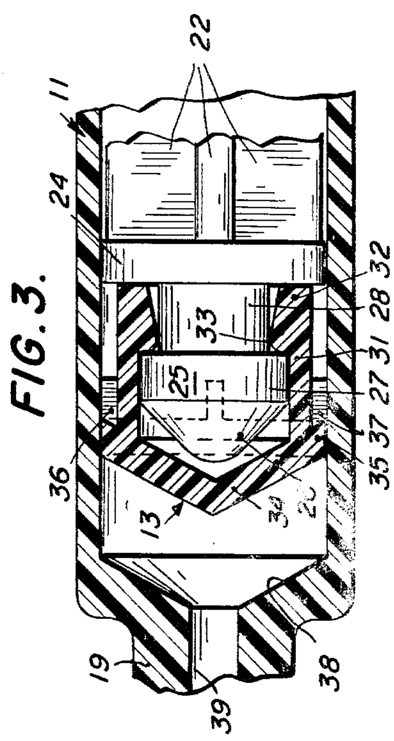
INVENTOR
HEINZ A. VON PECHMANN
BY
Robert T. Merrick PLASTIC SYRINGE
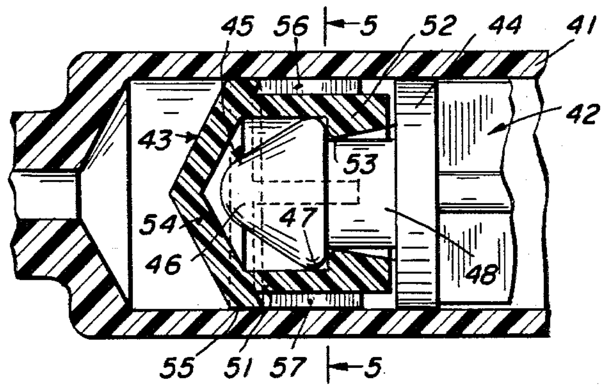
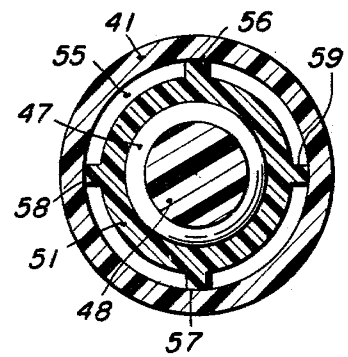
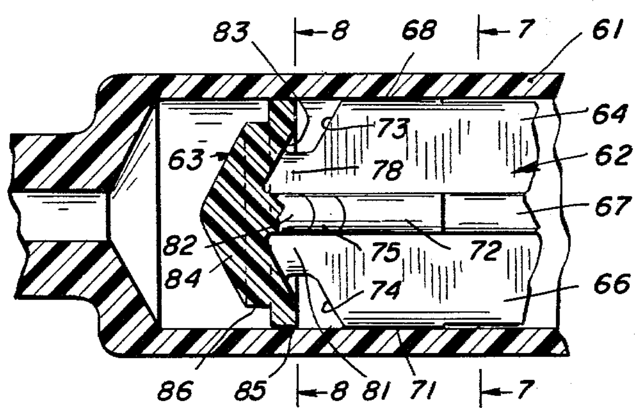
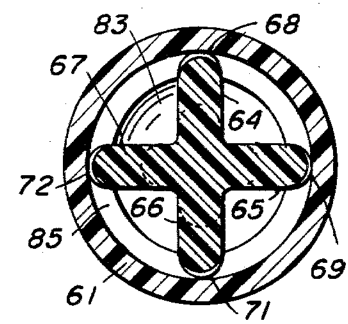
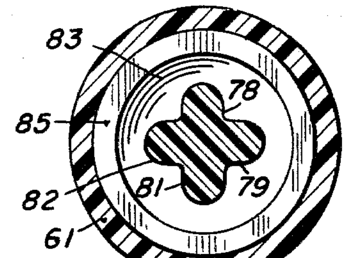
INVENTOR
HEINZ A. VON PECHMANN
BY
Robert T. Merrick United States Patent Office 3,253,592

Patented May 31, 1966

1

3,253,592
PLASTIC SYRINGE

Heinz A. von Pechmann, Lake View Terrace, Calif., assignor to Don Baxter, Inc., Glendale, Calif., a corporation of Nevada Filed June 8, 1962, Ser. No. 201,192
2 Claims. (Cl. 128—218)

This invention relates to an all-plastic syringe and more particularly to a disposable syringe wherein the barrel plunger and plunger tip are formed of plastic which is resistant to chemical attack by injectable drugs and which will provide an effective seal against leakage, either under pressure or vacuum, during use of the syringe, even after prolonged storage.

Disposable syringes have been made with polystyrene barrels and plungers, and rubber plunger tips on the plunger. These syringes were very effective in use with most injectable drugs, but with certain drugs the polystyrene barrels or the rubber plunger tips were attacked by these medications to cause swelling or to form solutions which could be toxic to the patient if injected. More resistant plastics have been used, but the rubber plunger tip still prevents the use of such syringes with certain drugs.

Attempts have been made to produce a satisfactory all-plastic syringe with the barrel, plunger and tip all made of a plastic compatible with all injectable drugs. Some of these materials are so opaque that it is impossible to observe the fluid contents of the barrel. Other materials were not satisfactory because the plastic did not have sufficient elastic recovery after deformation and the syringes were not consistent in their ability to seal under both pressure and vacuum. If sufficient interference was obtained to seal against leakage, the friction between the plunger tip and the barrel was so excessive that the plunger was very difficult to move in the barrel, and particularly when the plunger was moved slowly, the plunger would first stick, and then suddenly surge forward, and then stick again, which made accurate administration or measurement of dosage almost impossible.

Briefly stated, one preferred embodiment of the present invention has a very thin wall, polypropylene barrel and a high density or linear polyethylene plunger with an integrally formed sealing plunger tip or alternatively with a polyethylene or polystyrene plunger having a separate snap-on sealing plunger tip formed of linear polyethylene. The barrel is preferably made with a minimum internal taper or draft consistent with that needed to facilitate mold release. The outside diameter of the plunger sealing tip at the peripheral cylindrical surface, which contacts the inside of the barrel to provide a seal, should be slightly larger than the maximum internal diameter of the barrel to provide a slight interference, for example between 0.002 and 0.008 inch, for a tight seal. To provide a smooth easy movement of the plunger in the barrel and still obtain a good seal under pressure and vacuum, it is also desirable to provide a suitable lubricant which provides a lubricating film separating the sliding surfaces, such as the fluorocarbon lubricants containing trifluorochloroethylene polymers, or other similar lubricants.

The barrel of the plunger should be relatively thin, flexible and resilient, and the plunger sealing tip should have a relatively narrow annular ring contacting the barrel. The plunger sealing tip may be integrally formed or snapped onto the tip end of the plunger; but the annular ring should be integrally formed and resiliently connected to the cylindrical body of the plunger tip to permit a slight compression and expansion within the barrel which also expands to maintain a tight seal as the plunger

2 is moved through the barrel on either the vacuum or pressure stroke.

One object of the present invention is to provide an all-plastic syringe which is compatible with all injectable drugs and maintains a tight seal on both the vacuum and pressure strokes, and wherein the plunger slides freely and smoothly within the barrel to facilitate the administration of an accurate dosage.

Other objects and many of the attending advantages of this invention will be readily appreciated as the same becomes better understood by reference to the following detailed description when considered in connection with the accompanying drawings wherein:

FIGURE 1 is an exploded pictorial view illustrating one preferred embodiment of the all-plastic syringe of the present invention together with the needle and protector cap used therewith;

FIGURE 2 is an enlarged longitudinal sectional view taken axially through the assembled syringe, needle and protector cap of FIGURE 1;

FIGURE 3 is a further enlarged fragmentary sectional view illustrating the detailed configuration of the plastic plunger sealing tip mounted on the tip end of the plunger;

FIGURE 4 is an enlarged view similar to FIGURE 3 but illustrating a modification of the present invention;

FIGURE 5 is a cross-sectional view taken on the line 5—5 of FIGURE 4;

FIGURE 6 is an enlarged fragmentary sectional view of another modification of the present invention illustrating an integrally formed plunger and plunger sealing tip;

FIGURE 7 is a cross-sectional view taken on the line 7—7 of FIGURE 6; and

FIGURE 8 is a cross-sectional view taken on the line 8—8 of FIGURE 6.

Referring now to the drawings in detail and more particularly to FIGURES 1 and 2, one preferred embodiment of the present invention is illustrated therein including a thin, resilient, transparent plastic barrel 11 in which the plunger 12 and the snap-on plunger sealing tip 13 are slidably mounted.

The conventional hypodermic needle 14 has a cannula 15 secured to a hub 16 which is staked tightly onto the the tip 17 on the end of the barrel 11. The protector 18 fits over the needle 14 end engages the collar 19 of the barrel 11. These parts are assembled in the manner illustrated clearly in FIGURE 2.

The outer open end of the barrel is provided with a ribbed flange or finger grip 21 for engagement by the fingers of the operator. The body of the plunger 12 is provided with four radial ribs which form a light rigid central body portion 22 and terminate in the integrally formed outer disk or thumb rest 23 adapted to be engaged by the thumb in operation of the syringe. The other end of the central body portion 22 of plunger 12 terminates in an inner disk 24, which has a slightly smaller diameter than the inside of the barrel 11 and is integrally connected to the tip end 25. The whole plunger 12 may be integrally molded or otherwise formed from any suitable rigid plastic material, since it is not exposed to any drugs or solvents.

One preferred embodiment of the plastic plunger sealing tip of the present invention is clearly illustrated in the enlarged detailed sectional view of FIGURE 3, wherein the sealing tip 13 is shown mounted on tip end 25. The plunger tip end 25 consists of a rounded conical nose portion 26 connected to a cylindrical portion 27, which in turn is connected to the inner disk 24 by a reduced diameter neck portion 28.

The sealing tip 13 is adapted to snap on over the plunger tip end 25 until the cylindrical portion 27 firmly engages the cylindrical body or sleeve 31. Sleeve 31 is integrally connected to a collar 32 having a thickened wall to form an internal annular bead 33 which engages the shoulder at the rear of cylindrical portion 27 and also engages the reduced diameter neck portion 28 on the tip end 25 to releasably retain the sealing tip 13 thereon.

The collar 32 is tapered outwardly to provide a flared mouth or frusto-conical opening which readily receives the conical nose portion 26 on the tip end 25 to spread and enlarge the collar 32 while the sealing tip 13 is forced over the tip end 25 for a snap fit. The sleeve 31 is also integrally connected or formed with the conical end portion 34 which has substantially parallel inner and outer conical surfaces extended to provide a narrow annular ring 35 having a peripheral cylindrical surface which contacts the inside of the barrel 11. Ring 35 should have an outside diameter which is slightly larger than the maximum internal diameter of the barrel adjacent the open end of the barel to provide a slight interference. This interference should preferably be somewhere between a minimum of 0.002 inch and a maximum of 0.008 inch. The inner disc 24 and the body portion 22 of plunger 12 fit in the barrel 11 with a slight clearance.

While the barrel 11 should preferably be formed with substantially no taper or draft, at least a slight internal taper is usually provided to facilitate mold release. For most syringes of this type, for example, in 2 cc. and 5 cc. models, the taper from one end of the barrel 11 to the other might be in the order of 0.001 to 0.003 inch so that an interference of 0.003 inch adjacent the open end of the barrel 11 would increase to a maximum of 0.004 to 0.006 inch at the inner end of the barrel 11.

The sealing tip 13 is made from a plastic material which is preferably somewhat flexible and resilient, such as high density polyethylene, and which is therefore deformable in a radial direction to maintain a tight seal. However, four radial guide wings, such as those shown at 36 and 37, are provided to stiffen the sealing tip structure in a longitudinal direction, so that it will not flex too much longitudinally to break the seal, as the plunger is reciprocated in the barrel 11. The walls of the barrel 11 should preferably be made as thin as possible, while retaining sufficient strength to withstand the internal pressures exerted by fluid under pressure, and may be in the order of 0.020 to 0.040 inch thick. The minimum wall thickness will provide the optimum transparency, particularly when used with a somewhat translucent material such as polypropylene. The thin flexible wall of the barrel 11 also helps to maintain a tight fit against the periperal annular surface of the ring 35, particularly where the barrel 11 or plunger tip 13 may be slightly out of round. The barrel 11 actually expands somewhat as the plunger 12 with the sealing tip 13 is forced down through the barrel 11, particularly at the inner end of the barrel 11 which has a slightly smaller diameter than the outer open end.

Barrel 11 terminates in a frusto-conical section 38 leading into an axial fluid discharge passage or opening 39.

The particular configuration of the tip end 25 of the plunger 12 in conjunction with the internal configuration of the plunger sealing tip 13 permits a slight movement or wobble of the plunger 12 with respect to the sealing tip 13 without canting or cocking the plunger tip 13 with respect to the axis of the barrel 11, and thus disturbing the seal therebetween. The radial guide wings such as 36 and 37 also help stabilize the sealing tip 13 to prevent cocking or canting thereof with respect to the axis of the barrel. This floating action of the sealing tip 13 on the tip end 25 of the plunger 12 is also facilitated by the taper in the collar 32 which provides a space between the flared throat and the reduced diameter plunger portion 28.

This floating action of the sealing tip on the tip end of the plunger is further facilitated or augmented in the modification illustrated in the enlarged detailed fragmentary and sectional views of FIGURES 4 and 5 which illustrate one modification of the present invention.

In this modification, the plunger 42 is similar to the plunger 12 in FIGURES 1, 2, and 3, but the cylindrical tip end portion 27 of FIGURE 3 has been substantially eliminated so that the rounded conical nose portion 46 of the tip end 45 extends back to a rounded shoulder 47 connected to the reduced diameter neck 48, which in turn is connected to the inner disk 44 on plunger 42. This construction permits even more rocking action or wobble of the plunger 42 and the tip end 45 within the plunger sealing tip 43. Sealing tip 43 is substantially identical with the sealing tip 13, having a narrow annular ring 55, a cylindrical sleeve or body portion 51 surrounding the tip end 45 of the plunger 42 and a thickened collar 52 with an internal annular bead 53. Collar 52 surrounds the plunger neck portion 48 and bead 53 engages the rounded shoulder 47. The tapered collar 52 likewise provides a flared mouth to facilitate insertion of the tip end 45 of the plunger 42 with a snap fit.

The conical inner end 54 of sealing tip 43 is also substantially spaced from the conical nose portion 46 on the tip end 45. In this modification, however, since the sealing tip 43 has more freedom of motion for movement on the tip end 45, the radial guide wings 56, 57, 58, and 59 are substantially longer than those shown at 36 and 37 in FIGURE 3.

The fragmentary portion of the barrel 41 in FIGURES 4 and 5 would likewise be identical with the barrel 11 as illustrated in FIGURES 1, 2, and 3. The cross-sectional view of FIGURE 5 particularly illustrates the manner in which the guide wings 56, 57, 58, and 59 engage the side walls of barrel 41 for aligning the plunger tip 43 and maintaining it in its proper axial position within the barrel 41 without canting, even though the plunger 42 may be cocked or wobble within the barrel 41.

Another modification of the present invention is illustrated in the enlarged fragmentary sectional view of FIGURE 6 and the cross-sectional views of FIGURES 7 and 8, wherein the plunger 62 slidably mounted in the barrel 61 is integrally formed of a suitable plastic material, such as high density polyethylene, with the plunger sealing tip 63. The remainder of the syringe would be similar to that illustrated in FIGURES 1 and 2.

In this modification, the body of the plunger 62 consists of four radial ribs 64, 65, 66, and 67 which extend longitudinally thereof and are provided with raised portions adjacent their inner ends as indicated at 68, 69, 71, and 72 which act as guide wings for maintaining axial alignment of the plunger 62 and the sealing tip 63 within the barrel 61.

The radial ribs 64, 65, 66, and 67 are beveled at their inner ends adjacent the sealing tip 63, as indicated at 73, 74, and 75 in FIGURE 6, to a point where they are integrally connected with the narrower connecting ribs 78, 79, 81, and 82, as shown in FIGURES 6 and 8.

Ribs 78, 79, 81, and 82 are integrally joined to the inner conical surface 83 of the conical nose portion 84 of sealing tip 63. Sealing tip 63 is provided with an annular ring 85 having a cylindrical peripheral surface contacting the inside walls of the barrel 61 in sealing engagement therewith. The nose portion 84 is also provided with an annular groove 86, which provides some additional flexibility to the peripheral portion of the sealing tip 63 and also provides a sharp leading edge to seal tightly against the inner surface of barrel 61. Since the central conical nose portion 84 has a relatively thick stiff wall section, which is further rigidified by the integrally connected ribs 78, 79, 81, and 82, this flexibility in a radial direction is necessary particularly to maintain an optimum sealing contact with the walls of the barrel 61.

In all three modifications the frusto-conical sections at the inner ends of the barrels 11, 41, and 61 may have a slightly smaller angle with respect to the barrel axis, which is shown as 60° in the drawings herein, than the angle of the conical end of the plunger sealing tips 13, 43, and 63, so that the outer cylindrical edge of the sealing tips will contact the frusto-conical wall first, and by applying pressure on the plunger most of the liquid in the barrel will be squeezed out through the passage to the needle 15. The angle on the conical tips 13, 43, and 63 has been illustrated as 62°, thus providing a 2° angular difference, but this angle may be varied somewhat depending upon the resilience and elasticity of the plastic material utilized in the sealing tips. This function is similar to that disclosed in the copending application of Wendell I. Wall et al., Serial Number 815,431, filed May 25, 1959, for "Hypodermic Syringe," now United States Patent No. 3,050,059.

While the annular groove 86 in the modification of FIGURES 6, 7, and 8 will retain some of the liquid in the barrel 61, it will be obvious that the same degree of flexibility for the annular ring 85 can be provided by forming annular groove 86 on the opposite side of the nose portion 84 along the inner conical wall portion 83.

In the two modifications of FIGURES 1, 2, and 3 and FIGURES 4 and 5, it should be noted that a substantial space is left between the conical plunger noses 26 or 46 and the inside surface of the conical sealing tip walls 34 or 54. This allows more wobble of the plunger 12 or 42 without wobbling the sealing tip 13 or 43 and also provides more flexibility of the annular ring portions 35 or 55 in a radial direction in order to maintain the proper sealing engagement of the cylindrical peripheral surfaces with the internal wall surface of the barrel 11 or 41. The same result is in effect provided in the modification of FIGURES 6, 7, and 8 by beveling the ends of radial ribs 64, 65, 66, and 67 inwardly to form the narrow ribs 78, 79, 81, and 82 connecting the integral sealing tip 63 to the plunger 62 and by the annular groove 86 which provides additional flexibility and resilience to the annular ring portion 85.

While the particular plastic materials specified appear to be the best available at the present time with optimum characteristics for use with the present invention, it will be apparent that other plastic materials having similar chemical and physical characteristics will also be suitable.

The sealing tips 13, 43, and 63 preferably have an outside diameter at the peripheral cylindrical surface around the ring portions 35, 55, and 85 contacting their respective barrels which should preferably be slightly larger than the maximum internal diameter of the barrels to provide a slight interference. Preferably, the plunger sealing tip should have an outside diameter which is between 0.002 and 0.008 inch larger than the maximum inside diameter near the open end of the barrel. Using the preferred materials, the thin walled polypropylene barrel and the high density polyethylene plunger tip, excellent results have been obtained, for example, in a 2 cc. hypodermic syringe having an outside diameter on the annular ring of the plunger sealing tip of approximately 0.355 to 0.358 inch with a plunger barrel which tapered from 0.350 inch down to 0.347 inch. However, with the parts molded to these dimensions the plunger sealing tip tends to cold flow when stored in the barrel and may reduce in diameter to 0.352 to 0.355 inch which in actual operation of the syringe after storage, particularly at elevated temperatures, will tend to reduce the interference.

In order to provide a smooth, easy movement of the plunger in the barrel and still obtain a good seal under pressure and vacuum without any leakage, it is usually desirable, if not essential, to provide a suitable lubricant. Lubricants which have been found satisfactory in the present application with the particular thermoplastics indicated as the preferred materials in the present invention are the fluorocarbon lubricants containing trifluorochloroethylene polymers and having a greasy consistency. Specific examples of suitable lubricants for use in conjunction with the present invention are those sold under the trade names of "Fluorolube," which may be obtained from the Hooker Chemical Corporation in various viscosities, depending on the degree of polymerization, and "Kel F" which may be obtained in a grease or oil form from the Minnesota Mining and Manufacturing Company. Both of these lubricants are trifluorochloroethylene polymers and are preferably applied to the inside of the barrel as a relatively thin coating in a solution of perchloroethylene, tetrachloroethylene, acetone, toluene, or other suitable, volatile solvent.

It should be pointed out that these lubricants are far superior to other lubricants which have been found satisfactory in other applications. For example, when lubricants such as the silicone greases and fluorosilicone greases are used, the plunger tends to chatter or stick and slip providing a very jerky movement which makes it extremely difficult to administer an accurate dosage. Apparently, these other lubricants do not have sufficient adhesion to polypropylene and/or polyethylene, even though they may function as suitable lubricants with other materials.

Obviously, many other modifications and variations of the present invention may be made within the scope of the following claims.

What is claimed is:

1. A hypodermic syringe comprising: a thin-walled elongated barrel formed of radially expandable thermoplastic material and having a through bore open at one end and partially closed at the opposite end; and a rigid plunger reciprocably supported in said barrel bore and comprising an integral sealing tip, central body portion, and thumb rest projecting out of said barrel, said plunger comprising an integral homogeneous mass of thermoplastic material, said central body portion having a cross sectional area substantially less than the cross sectional area of said barrel bore, said central body portion including a plurality of radially projecting, longitudinally extending raised portions spaced circumferentially about the axis of said plunger and disposed substantially adjacent and spaced rearwardly of said sealing tip and engaging the surface of the barrel bore during the travel of said plunger and preventing angular canting of the sealing tip and breaking of the seal of the sealing tip with said barrel bore, said central body portion converging from said radially projecting raised portions to a central rear portion of said sealing tip, said sealing tip having an annular, cylindrical and peripheral sealing surface substantially in alignment with the longitudinal outer edges of said raised portions, and said sealing surface radially biasing said barrel outwardly along the path of travel thereof.

2. A hypodermic syringe as claimed in claim 1 in which said central body portion comprises a cross section including a plurality of radially extending ribs upon which said raised portions are formed.

References Cited by the Examiner

UNITED STATES PATENTS

| | | | |
|---|---|---|---|
| 2,679,838 | 6/1954 | Thompson | 124—12 |
| 2,821,397 | 1/1958 | Hartigan | 124—12 |
| 2,959,170 | 11/1960 | Laub | 128—218 |
| 3,026,872 | 3/1962 | Prater | 128—218 |
| 3,050,059 | 8/1962 | Wall et al. | 128—218 |

FOREIGN PATENTS

| | | |
|---|---|---|
| 223,386 | 8/1959 | Australia. |
| 228,538 | 5/1960 | Australia. |

RICHARD A. GAUDET, *Primary Examiner.*

EUGENE F. BLANCHARD, DANIEL S. BURK, *Assistant Examiners.*